United States Patent

Sui et al.

(10) Patent No.: US 9,151,651 B2
(45) Date of Patent: Oct. 6, 2015

(54) APPARATUS AND METHOD FOR DETERMINING TEMPERATURE

(71) Applicant: General Electric Company, Schenectadu, NY (US)

(72) Inventors: Lei Sui, Andover, MA (US); Benjamin Edward McDonald, Holliston, MA (US); Nicholas Anderson Hobbs, Boston, MA (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 13/740,850

(22) Filed: Jan. 14, 2013

(65) Prior Publication Data

US 2014/0198822 A1   Jul. 17, 2014

(51) Int. Cl.
*G01K 7/32* (2006.01)
*G01K 11/22* (2006.01)
*G01K 11/24* (2006.01)
*G01K 1/24* (2006.01)
*G01F 1/66* (2006.01)
*G01K 13/02* (2006.01)
*G01F 15/02* (2006.01)

(52) U.S. Cl.
CPC ............... *G01F 1/668* (2013.01); *G01F 15/02* (2013.01); *G01K 11/24* (2013.01); *G01K 13/02* (2013.01)
USPC ............................ 374/117; 374/118; 374/119

(58) Field of Classification Search
CPC ........................................................ G01F 1/662
USPC ........................................................ 374/117
See application file for complete search history.

(56) References Cited

U.S. PATENT DOCUMENTS

| | | | | |
|---|---|---|---|---|
| 5,437,194 A * | 8/1995 | Lynnworth | ................ | 73/861.27 |
| 5,515,733 A * | 5/1996 | Lynnworth | ................ | 73/861.27 |
| 6,047,602 A * | 4/2000 | Lynnworth | ...................... | 73/632 |
| 6,305,233 B1 * | 10/2001 | Braathen et al. | ........... | 73/861.28 |
| 7,470,056 B2 | 12/2008 | Yuhas | | |
| 7,942,068 B2 * | 5/2011 | Ao et al. | .................... | 73/861.31 |
| 8,192,075 B2 | 6/2012 | Desai | | |
| 8,256,953 B2 | 9/2012 | Yuhas et al. | | |
| 8,434,936 B2 * | 5/2013 | Cuffe et al. | ................... | 374/119 |
| 8,621,936 B2 * | 1/2014 | McDonald et al. | ........ | 73/861.18 |
| 2005/0016298 A1* | 1/2005 | Hill | ............................ | 73/863.03 |

(Continued)

FOREIGN PATENT DOCUMENTS

EP    0 605 944 A2    7/1994
WO   2011/088393 A2   7/2011

OTHER PUBLICATIONS

Nguyen, Transducer Design for Liquid Custody Transfer Ultrasonic Flowmetering, 2007 IEEE Ultrasonics Symposium, pp. 1831-1835, 2007.

(Continued)

*Primary Examiner* — Lisa Caputo
*Assistant Examiner* — Jamel Williams
(74) *Attorney, Agent, or Firm* — GE Global Patent Operation; Douglas D. Zhang

(57) ABSTRACT

An apparatus and method for determining temperature is disclosed. An ultrasonic signal is generated that propagates through a buffer and a portion of the signal is reflected at an interface. A time of flight is measured between generating the ultrasonic signal and detecting the reflected portion. The temperature is determined based on the time of flight of the reflected signal.

17 Claims, 6 Drawing Sheets

(56) References Cited

U.S. PATENT DOCUMENTS

2012/0266679 A1* 10/2012 Ao et al. .................. 73/644
2012/0271568 A1* 10/2012 Wilson ..................... 702/48
2013/0098167 A1* 4/2013 McDonald et al. ........ 73/861.18
2013/0121373 A1* 5/2013 Skliar et al. ............... 374/117
2013/0219707 A1* 8/2013 Sui et al. .................. 29/729
2013/0283927 A1* 10/2013 Sui et al. .................. 73/861.18

OTHER PUBLICATIONS

International Search Report and Written Opinion issued in connection with WO Application No. PCT/US2014/010146 dated Jul. 17, 2014.

* cited by examiner

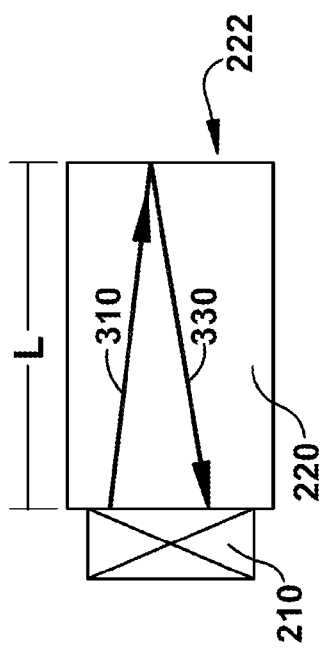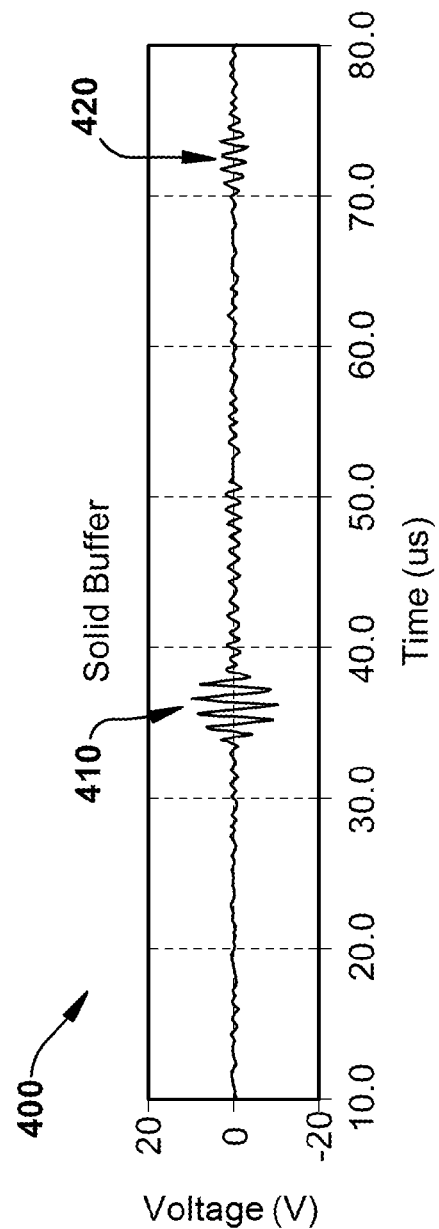

APPARATUS AND METHOD FOR DETERMINING TEMPERATURE

FIELD OF THE DISCLOSURE

The subject matter disclosed herein relates generally to measuring temperature and, more particularly, to measuring temperature in a fluid housing by an ultrasonic technique.

BACKGROUND

Ultrasonic flow meters are used to determine the flow rate of a variety of fluids (e.g., liquids, gases, etc.) flowing in pipes or other test objects. In one type of ultrasonic flow meter employing transit time methods, a pair of ultrasonic transducers are positioned upstream and downstream relative to each other, forming an ultrasonic path between the transducers. Each ultrasonic transducer generates an ultrasonic signal (e.g., a sound wave) along the ultrasonic path through the fluid flowing in the pipe that is received by and detected by the other ultrasonic transducer. The velocity of the fluid along the ultrasonic path can be determined as a function of the difference between (i) the transit time of an ultrasonic signal propagateing upstream, i.e., along the ultrasonic path from the downstream ultrasonic transducer to the upstream ultrasonic transducer, substantially against the flow direction, and (ii) the transit time of an ultrasonic signal propagateing downstream, i.e., along the ultrasonic path from the upstream ultrasonic transducer to the downstream ultrasonic transducer, substantially with the flow direction.

It is often necessary for an ultrasonic flow meter to know the temperature of the fluid, pipe walls, buffers, wedges, void spaces, etc. in order to determine an accurate flow rate. Temperature is typically measured by an additional sensor which measures a local temperature, for example inserted into the fluid, attached to the pipe wall, a wedge, or a buffer. This additional sensor increases the cost and complexity of the ultrasonic flow meter.

The discussion above is provided for general background information and is not intended to be used as an aid in determining the scope of the claimed subject matter.

BRIEF DESCRIPTION OF THE INVENTION

An apparatus, a method, and a computer readable medium for determining temperature is disclosed. The apparatus includes a housing forming a containment volume partially in contact with a fluid and a transducer for generating an ultrasonic signal that is operatively connectable with the housing. A buffer is located between the transducer and the fluid that propagates the ultrasonic signal therethrough, and the buffer is thermally coupled with the fluid, the housing, or both. A processing circuit is operatively connected with the transducer. The processing circuit causes the first transducer to generate the ultrasonic signal and detects a reflected portion of the ultrasonic signal reflected from one or more interfaces of the buffer. The processing circuit measures a time of flight of the reflected portion and determines a temperature based at least partially on the time of flight.

In another embodiment, a method for determining temperature involves generating or causing an ultrasonic signal to propagate through a buffer. The buffer is thermally coupled to a fluid or a housing. The method further involves detecting one or more reflected portions of the ultrasonic signal reflected from one or more interfaces of the buffer, and measuring a time of flight of the one or more reflected portions. The method further involves determining a temperature based at least partially on the time of flight.

In yet another embodiment, a computer readable medium for determining temperature comprises instructions to be executed by processing logic that causes a transducer to generate an ultrasonic signal, detects a reflected portion of the ultrasonic signal reflected from one or more interfaces of a buffer, measures a time of flight of the reflected portion, and determines a temperature based at least partially on the time of flight.

This brief description of the invention is intended only to provide a brief overview of subject matter disclosed herein according to one or more illustrative embodiments. This description is not intended to limit the scope of the claimed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of the invention and are therefore not to be considered limiting of its scope. The scope of the invention encompasses other equally effective embodiments. These and other features, aspects, and advantages of the invention will become better understood when the following detailed description is read with reference to the accompanying drawings, in which like characters represent like parts throughout the drawings, wherein:

FIG. 4a is a schematic illustration of a reflected portion of an ultrasonic signal in the sensor assembly of FIG. 2;

FIG. 4b is a diagram of an electrical signal generated by the sensor assembly of FIG. 2 when it receives a reflected portion illustrated in FIG. 4a;

FIG. 7b is a diagram of an electrical signal generated by a transducer when it receives ultrasonic signals illustrated in FIG. 7a.

DETAILED DESCRIPTION OF THE INVENTION

One or more specific embodiments will be described below. Although the following discloses example systems including, among other components, software executed on hardware, it should be noted that such systems are merely illustrative and should not be considered as limiting.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

In general, the example methods and apparatus described herein may be used to measure fluid and/or pipe wall temperatures in an ultrasonic flow meter or other device that may or may not contain fluid. Ultrasonic flow meters measure flow rate in a conduit for the exemplary purposes of controlling a process or determining the total amount of a fluid transferred in an, e.g., custody transfer, such as when oil or gas is delivered or otherwise transferred from one party to another. The accuracy of such measurements may depend on the temperature of the fluid flowing in the conduit or on the temperature of the conduit itself, yet the fluid and the inner surface of the conduit may be virtually inaccessible for direct temperature measurement during operation.

The example methods and apparatus may be implemented using any acoustic technology capable of propagating an acoustic signal through a material such as, for example, stainless steel. Ultrasound is an example acoustic measurement technology that is capable of transmitting compressional wave signals and shear wave signals through a material. The example apparatus determines time of flight associated with the propagation of the ultrasonic signal and its reflection (or reflections) then determines one or more local temperatures based on a time of flight.

Figure 1:
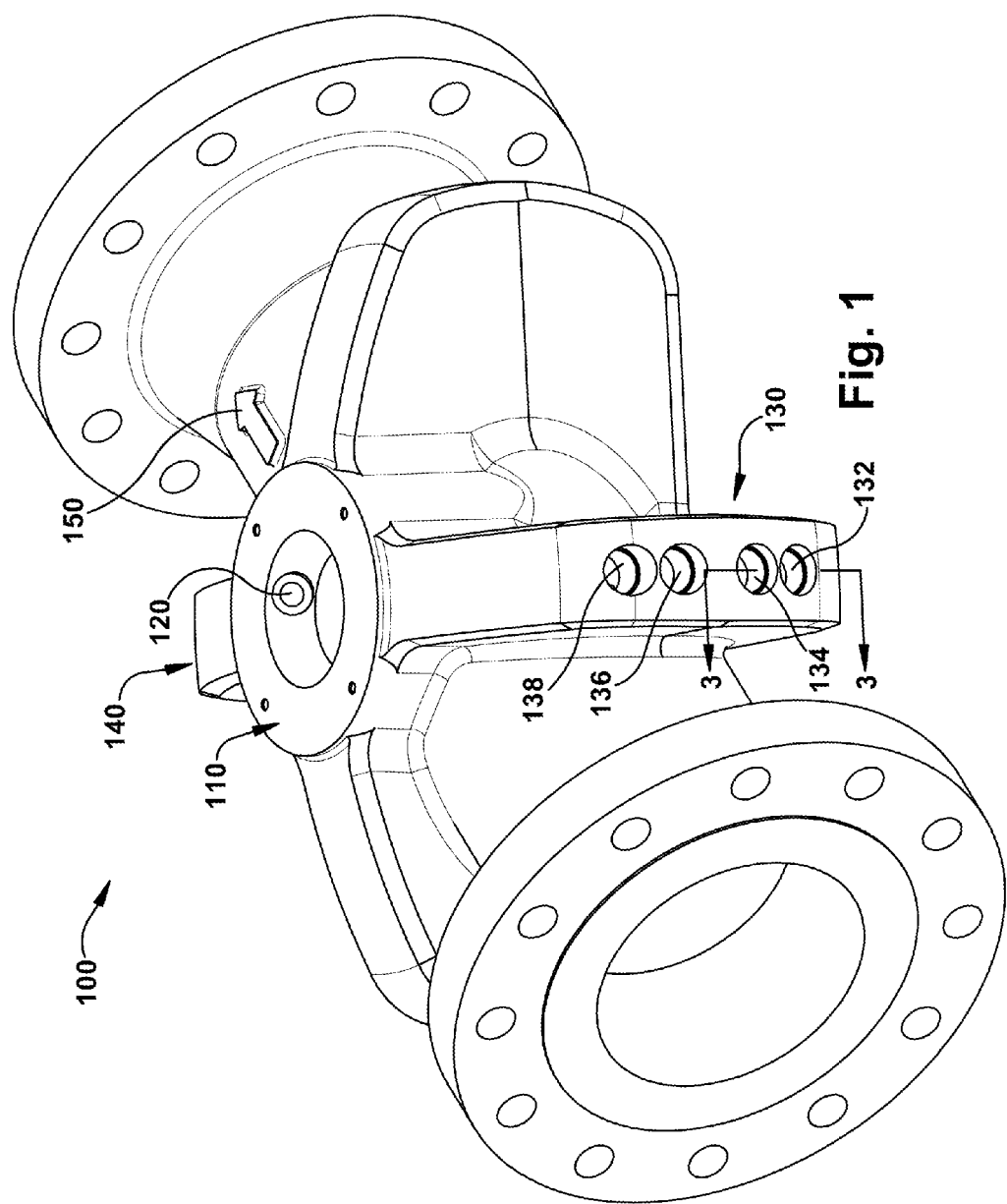
FIG. 1 illustrates an exemplary flow cell, or housing, used as a containment volume in which fluid temperature is measured according to the invention.

FIG. 1 illustrates an exemplary flow cell 100, or housing, which defines a containment volume (internal conduit, not shown) through which fluid flow is measured. The processing circuitry (not shown) of an ultrasonic flow meter is mounted on platform 110 and cables may be run through, e.g., access port 120, to ultrasonic transducers (discussed below with respect to FIG. 2) mounted in one or more of quadrants 130, 140. Shown in quadrant 130 are four sensor ports 132, 134, 136, 138 and likewise in quadrant 140 there may be four sensor ports (not shown). It will be understood that more or fewer sensor ports may be provided for and that the exact geometry shown (angles, placement, etc.) is merely illustrative. For the exemplary flow direction 150, quadrant 130 is referred to as an upstream quadrant and quadrant 140 is a downstream quadrant. Sensor ports 132, 134, 136, 138 are referred to as upstream sensor ports and sensor ports associated with quadrant 140 are downstream sensor ports. Sensor ports (e.g., ultrasonic sensor ports 132-138) provide for the installation of a sensor assembly 200 as discussed below in relation to FIG. 2 and may allow access to the interior conduit of flow cell 100.

Figure 2:
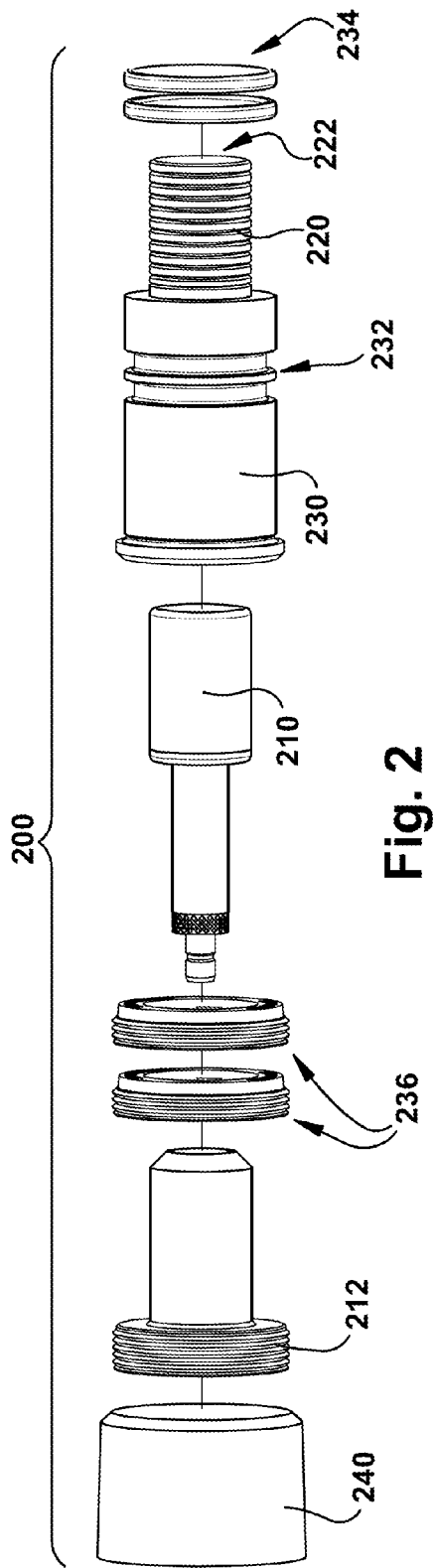
FIG. 2 is a schematic diagram of an exemplary sensor assembly that may be installed in the flow cell of FIG. 1.

FIG. 2 is a schematic diagram of an exemplary sensor assembly 200 which is used to measure temperature. Sensor assembly 200 includes a transducer 210 and buffer 220. Buffer 220 includes an interface 222 that may be in contact with a fluid in the containment volume (conduit) of a flow meter. It will be understood the fluid may be a liquid (e.g., water, oil, liquid natural gas) or a gas (e.g., water vapor, natural gas) or any combination thereof, and may include particulate matter therein (e.g., sand, mud, sludge) during operation of the ultrasonic flow meter. Transducer 210 is preferably an ultrasonic transducer.

Buffer 220 is integrally formed with an insert 230 configured to provide grooves 232 to accommodate one or more O-rings 234 which provide a pressure boundary or seal between the fluid and the remainder of the sensor assembly beyond buffer 220. Insert holding nuts 236 are used to secure insert 230 in a sensor port of a flow cell (e.g., one of sensor ports 132, 134, 136, 138), and may have an open center to allow installation and removal of transducer 210 without removal of insert holding nuts 236. Further, insert 230 accommodates transducer 210 via, e.g., a void within insert 230.

Also shown in FIG. 2 is transducer retaining nut 212 to secure transducer 210. Plug 240 closes off or caps a sensor port in which sensor assembly 200 is installed. It will be understood that a number of different types of sensor assemblies, transducers, and correspondingly shaped sensor ports (shown in more detail below) can be used in embodiments of the present invention, including sensor assemblies that do not use an insert and including embodiments that do not use a correspondingly shaped sensor port.

It will be understood that a cable (not shown) is operatively connected to transducer 210 to deliver an exciting voltage or pulse (generally of a specific spectrum) from a circuit (discussed below) that will cause transducer 210 to generate an acoustic wave. The active element (not shown) of transducer 210 may be a piezoelectric material. The physical dimensions of piezoelectric materials react to electrical signals and may therefore be used to generate acoustic waves. When an acoustic wave impinges upon (is received by) a piezoelectric material it generates an electrical signal. Transducers and piezoelectric materials are well known in the art and will be readily understood by those of skill without further discussion herein. The frequencies, frequency ranges, or spectrum expected to be used are typically, but not limited to, ultrasonic frequencies. The acoustic waves generated or received thereby are referred to herein as ultrasonic signals. The terminology "ultrasonic signal" should be distinguished from the electrical signals (voltages, pulses) that cause (drive, excite) the transducer to generate the ultrasonic signal, and should be distinguished from the electrical signals (voltage, pulses) generated by a transducer when it receives an ultrasonic signal. Ultrasonic signal as used herein refers to acoustic waves of ultrasonic frequency propagateing through an object, material, or fluid.

Figure 3:
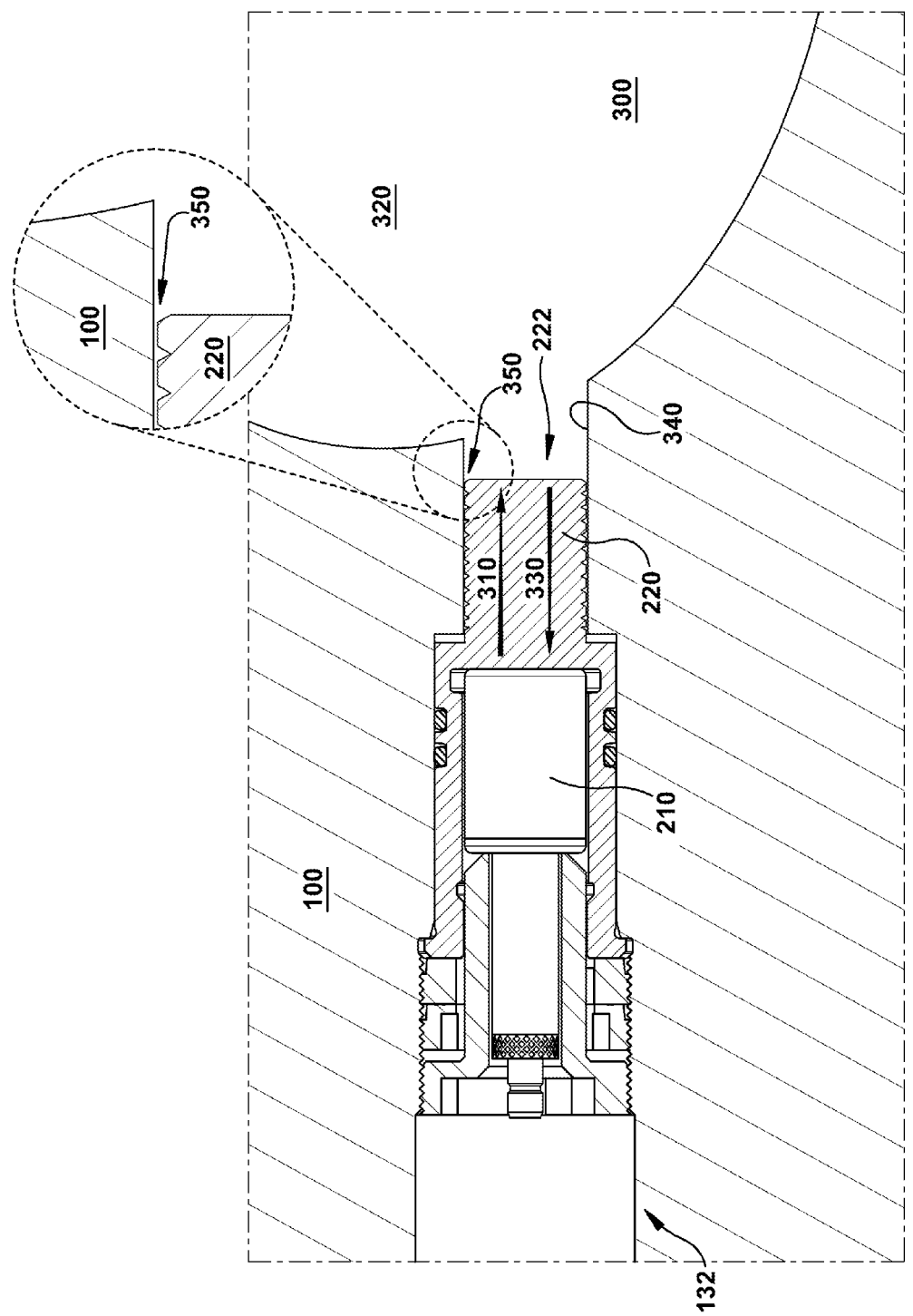
FIG. 3 is an enlarged cross-sectional view of a portion of the flow cell of FIG. 1 taken approximately along the line 3-3 in FIG. 1.

FIG. 3 illustrates an enlarged cross-section of flow cell 100. Shown is sensor port 132 in which one of a sensor assembly (e.g., sensor assembly 200) may be installed. Also shown is containment volume 300 (e.g., conduit) of flow cell 100, in which a fluid may be flowing for rate measurement.

In operation, when transducer 210 is excited by an electrical voltage or pulse (e.g., from a processing circuit, discussed below, of an ultrasonic flow meter) it generates and transmits an ultrasonic signal 310 into buffer 220. The ultrasonic signal propagates through buffer 220 and across interface 222 and into fluid 320. As shown in FIG. 3, buffer 220 is located between transducer 210 and fluid 320. At interface 222 some of the energy in ultrasonic signal 310 may be reflected back toward transducer 210 in the form of reflected portion 330. Reflected portion 330 propagates back through buffer 220 and will be received by transducer 210 which will convert reflected portion 330 to an electrical signal which may be detected by the processing circuit (not shown).

In one embodiment, processing circuitry of an ultrasonic flow meter will measure the time of flight starting from when ultrasonic signal 310 is generated until the time reflected portion 330 is received or detected. This time of flight represents the time of flight for a round trip in buffer 220, i.e., from transducer 210 (operatively in contact with a first end of buffer 220) to interface 222 and back. The speed of sound in buffer 220 may change with temperature and the physical dimensions (e.g., length) of buffer 220 may change with temperature, and thus it will be understood the time of flight will vary with the temperature of buffer 220.

FIG. 4a illustrates the reflection of ultrasonic signals in buffer 220. Shown is transducer 210 operatively connected to buffer 220. Buffer 220 is of length L and when transducer 210 transmits, ultrasonic signal 310 propagates through buffer 220 a length L before it encounters interface 222. At interface 222 some of the energy in ultrasonic signal 310 may be reflected back toward transducer 210 in the form of reflected portion 330. Reflected portion 330 propagates through buffer 220 a length L in the opposite direction before it encounters transducer 210 which receives reflected portion 330 (i.e., a first echo) and converts received reflected portion 330 into electrical signal 400 (shown in FIG. 4b) which is detected by processing circuitry (discussed below) of a flow meter. For example, pulse 410 corresponds to the received reflected portion 330. Additional reflections may occur. For example, some of the energy in reflected portion 330 may be further reflected at transducer 210 causing a second reflected portion (not shown) to propagate length L which may likewise cause a third reflected portion (not shown) at interface 222 which may result in the third reflected portion being received by transducer 210 (i.e., a second echo) and being detected by processing circuitry (discussed below) of a flow meter. For example, pulse 420 corresponds to the second echo (i.e., the received third reflected portion).

It will be appreciated that a time of flight may be defined between any two times above. For example, times of flight between the generation, the reception of the first echo, the reception of the second echo, or any combination of these, may be measured and any of these, or another, is used as the time of flight for temperature determination.

The relationship between the temperature of buffer 220 and the time of flight of ultrasonic signal 310 and its reflected portion 330 depends on: the material from which buffer 220 is made; the frequency, frequency range, or pulse shape of ultrasonic signal 310; the operating temperature range of the fluid or the conduit; and other factors. The relationship is preferably determined by empirical data established by experimentation and recorded in a lookup table, or the relationship may be capable of being expressed in an algorithm, or a calculation may be utilized to calculate an estimated temperature from a time of flight.

For example, one such algorithm involves an iterative calculation based upon Eq. 1 below for determined temperature, T, for a first echo time of flight (i.e., a single round trip through buffer 220):

$$T = \frac{t * C_L - 2L_o}{\alpha * 2L_o} + T_0 \quad [1]$$

Where $T_o$ is a reference temperature,
$L_o$ is the length of the buffer at reference temperature $T_o$,
t is the measured time of flight,
$C_L$ is the longitudinal speed of sound in the buffer, and
$\alpha$ is a linear thermal expansion coefficient.

Because $C_L$ itself varies with temperature, Eq. 1 may be calculated with an assumed value (e.g., value at reference temperature $T_o$) and a temperature T determined, then the value of $C_L$ can be updated based on the determined temperature by, e.g., a tabulated or interpolated reference, and a subsequent temperature T is determined, and so on. The iterative process would continue until each subsequently calculated temperature T sufficiently converges (i.e., doesn't change much on each iteration). It should be understood that other models of sound travel and temperature effects, or other modes of ultrasound, may require different analytical or numerical methods and the above iterative approach is merely one possibility.

In an alternative embodiment, time of flight in buffer 220 for various temperatures, T, may be experimentally determined, tabulated, and made available as a lookup table for processing circuitry (described below) of a flow meter.

In various embodiments, the temperature of buffer 220 is in equilibrium with the temperature of fluid 320 or conduit wall 340. Buffer 220 is at least partially thermally coupled to fluid 320, flow cell 100, or both. To be thermally coupled is to mean that if the temperature of, e.g., fluid 320, increases it will cause the temperature of buffer 220 to increase, all else being equal. In the embodiment as shown in FIG. 3, buffer 220 is in contact with fluid 320 at interface 222 and there is a clearance gap 350 between the edges of buffer 220 and the wall of sensor port 132 which allows fluid 320 to permeate clearance gap 350. As a result, buffer 220 is at least partially thermally coupled to fluid 320. Buffer 220 may be sufficiently thermally coupled to fluid 320 that the temperature of buffer 220 may equal the temperature of fluid 320. Alternatively, buffer 220 may be sufficiently thermally coupled to fluid 320 such that the temperature of buffer 220 is indicative of the temperature of fluid 320 even if their respective temperatures are not the same. In alternate embodiments, buffer 220 may not be in direct contact with fluid 320 but nonetheless may be sufficiently thermally coupled to fluid 320. For example, a thin pressure boundary may be between buffer 220 and fluid 320 that prevents fluid 320 from directly contacting interface 222 and/or prevents fluid 320 from permeating clearance gap 350, yet is not so thermally insulating as to shield buffer 220 from temperature changes in fluid 320.

In alternate embodiments, the temperature of buffer 220 may be thermally coupled to conduit wall 340. For example, there may not be a clearance gap 350 and buffer 220 may be in direct contact with conduit wall 340. Addition of a pressure boundary that further shields interface 222 from fluid 320 would likely cause buffer 220 to be more strongly thermally coupled to conduit wall 340 than to fluid 320. It will be understood that in any of these exemplary embodiments, the temperature of conduit wall 340 is likely to increase or decrease as a result of the temperature of fluid 320 increasing or decreasing, respectively, and vice versa. In all of the exemplary embodiments, buffer 220 is at least partially thermally coupled to fluid 320, conduit wall 340, or both. As a result, the temperature of buffer 220 is indicative of the temperature of fluid 320, conduit wall 340, or both.

In any case, the determination of the temperature of buffer 220 may be advantageously used to improve the accuracy of an ultrasonic flow rate measurement, to detect heating or cooling, or as part of a control of a processing system, e.g., for processing fluid 320. For example, a temperature increase will generally cause an inner diameter of a conduit to increase, thus increasing the cross-sectional area of the conduit. Such a change will increase the volume of fluid flowing for a particular linear flow rate (e.g., speed), and a flow meter may incorporate the temperature in calculations to account for this change.

Figure 5:
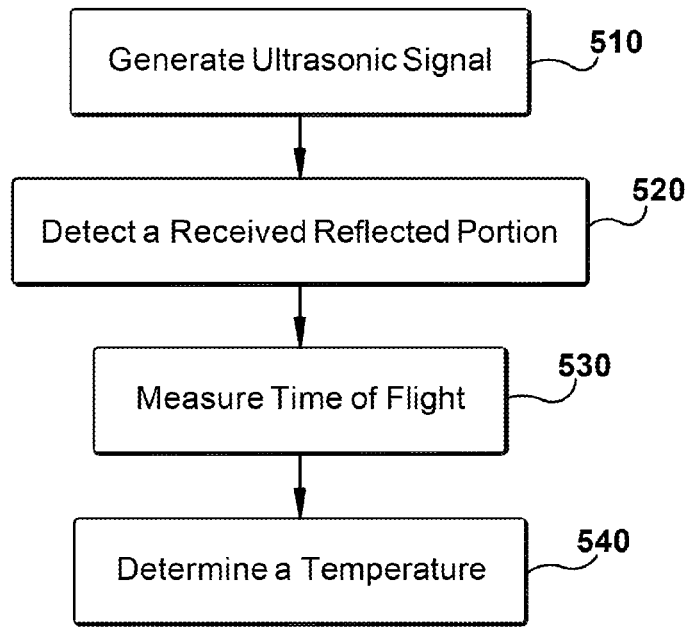
FIG. 5 is a flow diagram of an exemplary method for determining temperature by an ultrasonic technique.

Turning to FIG. 5, an exemplary method 500 of determining temperature is shown. At block 510 an ultrasonic signal (e.g., ultrasonic signal 310) is generated and transmitted into an object (e.g., buffer 220) through which it propagates. At block 520 a reflected portion (e.g., reflected portion 330) of the ultrasonic signal is detected, for example, it is received by transducer 210 and converted to an electrical signal which is detected by processing circuitry. At block 530 a time of flight is measured, which may be the time of flight between the generation at block 510 and the detection at block 520, but may alternatively be, for example, the time of flight between any two detections wherein one or more detections correspond to a first or subsequent echo (i.e., a further reflected portion as discussed above). The measured time of flight may be any convenient time of flight. Those of skill will see further variations and embodiments for the measured time of flight capable of enabling the temperature determination. One such further time of flight, for example, is discussed below and referred to as a "triple traverse." Continuing with the exemplary method of FIG. 5, at block 540 a temperature is determined at least partially on the basis of the measured time of flight. The temperature may be determined by various methods as discussed above, for example by a lookup table or by a calculation. The temperature determined may be that of the object (e.g., buffer 220) or may be that of something else in sufficient thermal equilibrium (not necessarily equal temperature) with the object (e.g., fluid 320, conduit wall 340).

Figure 6:
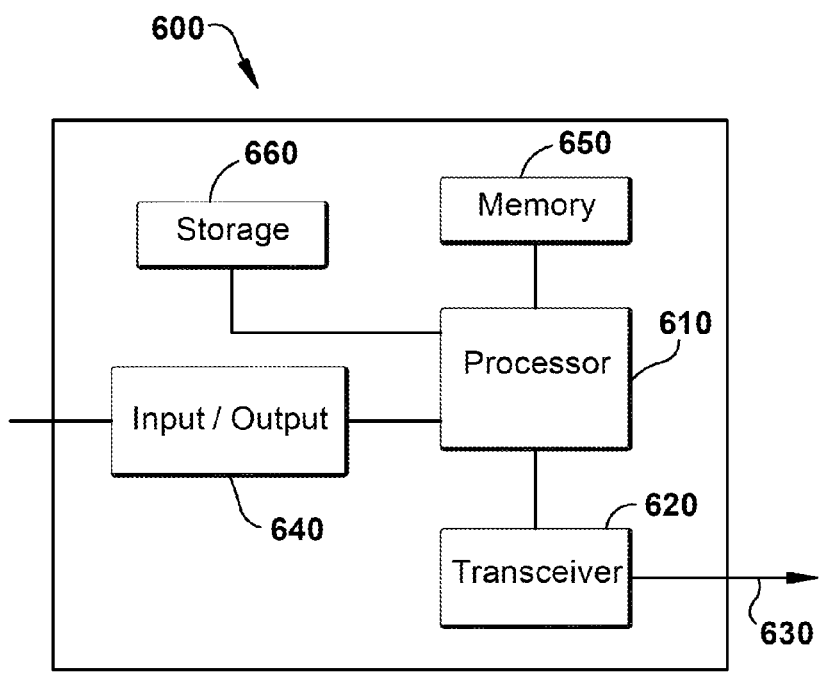
FIG. 6 is a block diagram of an exemplary processing circuit of an ultrasonic flow meter that may implement the method of FIG. 5.

Turning to FIG. 6, an exemplary processing circuit 600 of a flow meter is shown that may be used in part to implement the method of FIG. 5. Processing circuit 600 has a processor 610 which controls a transceiver 620. Transceiver 620 is capable of generating the electrical signals (voltages, pulses) that cause (drive, excite) transducer 210 to generate ultrasonic signals. Transceiver 620 is also capable of detecting from transducer 210 electrical signals generated by transducer 210 in response to ultrasonic signals received by transducer 210. Transceiver 620 is operatively connected to transducer 210 by means of, e.g., an electrical connection 630 (e.g., coaxial cable). Processor 610 may also be operatively connected to input/output 640 which may be, or may provide support for, a display panel, a monitor, a keyboard, a keypad, a serial interface, or any other interface device. It will be appreciated that any number of interface devices may be supported by input/output 640.

Processor 610 is operatively connected to a memory 650 and/or a storage 660. Memory 650 or storage 660 each are capable of storing data or computer-readable instructions for use by processor 610. Storage 660 may provide non-volatile storage of computer-readable instructions, and non-volatile storage of data, such as a tabular database for lookup of, e.g., tables of temperatures for given times of flight or tables of longitudinal speed of sound for given temperatures, for the determination of temperature at block 540 via an algorithm, calculation or lookup by processor 610, as discussed above. Data or computer readable instructions may be copied from storage 660 to memory 650 which may provide volatile storage with faster access to the data or instructions by processor 610.

Processing circuit 600 may have more or fewer components than shown in FIG. 6. Any combination or equivalent substitutions of the sub-components shown may be considered a processing circuit 600 for the purpose of practicing the invention. It will be appreciated that processor 610 or transceiver 620, alone or in combination with any other sub-components shown, may be implemented as a generic processor, an Application Specific Integrated Circuit (ASIC), a Field Programmable Gate Array (FPGA), or any other combination of circuitry capable of achieving the recited functions. Further, processor executable instructions and/or data stored in memory 650 or storage 660 in combination with processor 610, transceiver 620, or input/output 640, alone or in combination, may be considered processing logic and may be capable of equivalent implementation as a circuit or a logic circuit without expressly having computer-readable instructions. Such variations are intended to be within the scope of the invention and may collectively be referred to as processing logic or a processing circuit.

Figure 7A:
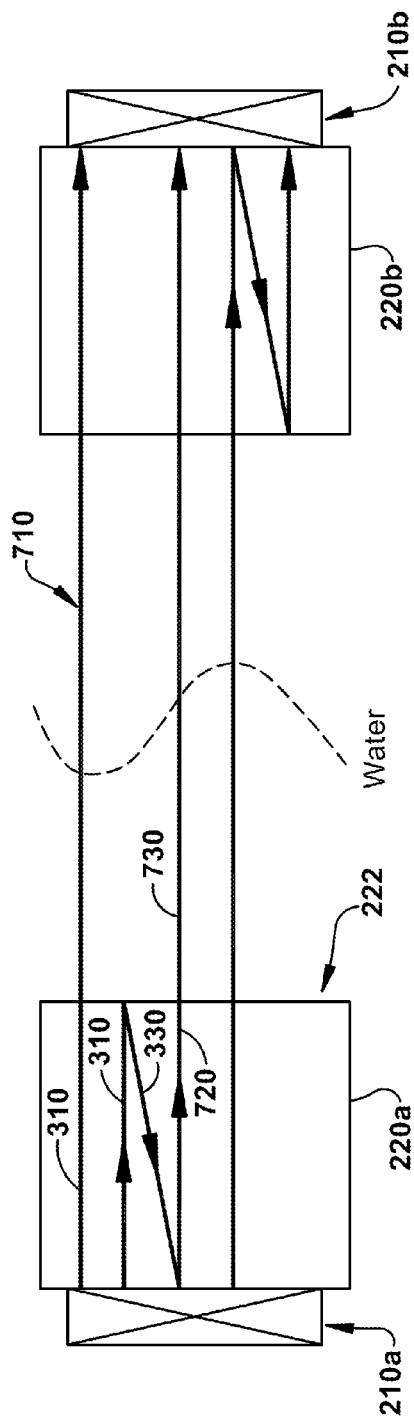
FIG. 7a is a schematic illustration of an alternate scenario for a reflected portion of an ultrasonic signal in the sensor assembly of FIG. 2.

FIG. 7a illustrates an alternative arrangement for the reflection of ultrasonic signals than shown in FIG. 4a. Shown is first transducer 210a operatively connected to first buffer 220a. When first transducer 210a transmits, ultrasonic signal 310 propagates through first buffer 220a and encounters interface 222. At interface 222 some of the energy in ultrasonic signal 310 may be reflected back toward first transducer 210a in the form of reflected portion 330, but some of the energy in ultrasonic signal 310 may continue into fluid 320 (e.g., water, in FIG. 7a) as ultrasonic signal 710 and may ultimately be received at a second transducer 210b. Meanwhile reflected portion 330 may propagate through buffer 220a in the opposite direction and encounter first transducer 210a. Some of the energy in reflected portion 330 may be further reflected at first transducer 210a causing a second reflected portion 720 to propagate through first buffer 220a. A majority of the energy in reflected portion 720 may continue into fluid 320 as reflected portion 730 and may ultimately be received at second transducer 210b at a later time than ultrasonic signal 710. Ultrasonic signal 710 and reflected portion 730 represent two ultrasonic paths by which ultrasonic energy may reach second transducer 210b. It should be noted that the energy in reflected portion 730 has traversed buffer 220a three times, thus this embodiment of a reflected portion is termed a "triple traverse."

Figure 7B:
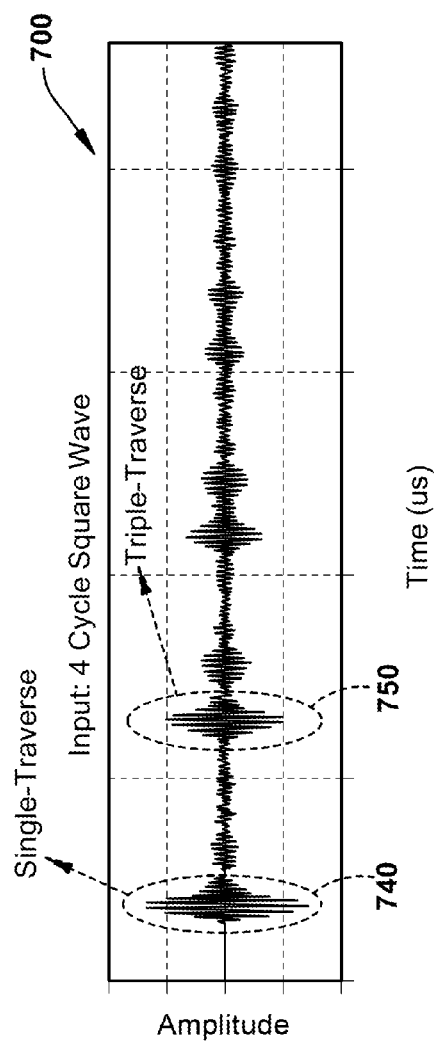

FIG. 7b shows an exemplary electrical signal 700 that results when ultrasonic signal 710, and subsequently reflected portion 730, is received by second transducer 220b. Processing circuit 600 detects electrical signal 700 and pulses 740 and 750 shown. Pulse 740 corresponds to the received ultrasonic signal 710 and pulse 750 corresponds to the received reflected portion 730. The time difference between pulse 740 and pulse 750 is a time of flight that may be used in the determination of temperature. In this exemplary electrical signal, time of flight between pulse 740 and pulse 750 represents the time it takes to traverse buffer 220a twice. It should be understood that additional embodiments of reflected portions of ultrasonic energy may be advantageously used to measure (530) a time of flight and determine (540) a temperature. For example, also shown in FIG. 7a without labels is yet a third path by which ultrasonic energy may reach second transducer 210b involving a pair of reflections in a second buffer 220b. Embodiments involving more or different reflections are within the scope of the present invention.

Alternative embodiments of the invention include a plurality of sensor assemblies and at least one processing circuit that controls and generates necessary electrical signals and detects received signals to determine the temperature at one or more of the transducers by method 500. With a plurality of transducer assemblies installed at, e.g., sensor ports 132, 134, 136, 138 and others in quadrant 140 or elsewhere, the temperature of fluid 320 may be determined at multiple locations. A set of temperatures at multiple locations is a temperature profile. The temperature profile may be used to predict uneven flow of fluid 320 within containment volume 300, predict mixing within fluid 320 or other variations in fluid 320 in order to improve flow rate measurements, temperature control, process control, or other purposes. Temperature profiles may be temperatures determined at multiple locations along the length of a pipe, multiple locations around a circumference of a containment volume, or any other combination of multiple locations, and may improve flow rate measurements, indicate cooling or heating, or may be used to otherwise control a process.

Alternative embodiments of the invention include determining (540) a temperature at multiple points in time to form a time profile of a temperature. Such may be advantageously used to detect or document a change in temperature, a start-up, a shut-down, for process control or otherwise. The time profile of the temperature, or temperature history, may be recorded or stored, e.g., in storage 660.

As will be appreciated, aspects of the present invention may be embodied as an apparatus, method, or computer program. A computer program may be embodied in one or more computer readable medium(s) having processor executable instructions encoded thereon.

Any combination of one or more computer readable medium(s) may be utilized. A computer readable medium may include, by way of non-limiting example, an electronic, magnetic, optical, electromagnetic, infrared, or semiconductor system, apparatus, or device, or any suitable combination thereof. More specific examples, without limitation, include an electrical connection having one or more electrical contacts, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable medium may be any tangible medium that can contain or store a program for use by or in connection with an instruction execution system, apparatus, or device.

Computer program code and/or executable instructions for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute on any suitable computing device located at any suitable location according to various aspects of the invention. For example and without limitation, the program code may execute on a user device, a system device, a remote device, a server, etc., or may be executed partly on any one or other of these in combination. A remote computer or a server, etc., may be connected to a user device through any type of network.

This written description uses examples to disclose the invention, including the best mode, and to enable any person skilled in the art to practice the invention, including making and using any devices or systems and performing any incorporated methods. The patentable scope of the invention, however, is to be defined by the claims alone, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed is:

1. An apparatus for measuring temperature comprising:
   a housing forming a containment volume and at least partially in contact with a fluid;
   a transducer for generating an ultrasonic signal and being operatively connectable with the housing;
   a buffer that propagates the ultrasonic signal therethrough, and being at least partially thermally coupled with at least one of the fluid and the housing; and
   a processing circuit operatively connected with the transducer and configured to:
   cause the transducer to generate the ultrasonic signal;
   detect a received reflected portion of the ultrasonic signal reflected from one or more interfaces of the buffer;
   measure a time of flight of the reflected portion of the ultrasonic signal;
   determine a temperature of the buffer based at least partially on the time of flight; and
   determine a temperature of at least one of the fluid and the housing based on the temperature of the buffer.

2. The apparatus of claim 1, wherein determining the temperature is further based on tabulated data.

3. The apparatus of claim 1, wherein the one or more interfaces of the buffer is in contact with the fluid.

4. The apparatus of claim 1, wherein the processing circuit is further configured to:
   repeat the causing, detecting, measuring and determining at a plurality of intervals; and
   use one or more determined temperatures of the buffer, fluid, and housing for one or more of:
   applying a correction to a flow rate measurement;
   applying a control to a process;
   detecting an event; and
   recording the determined temperatures.

5. A method for determining a temperature comprising:
   causing an ultrasonic signal to propagate in a buffer, wherein the buffer is at least partially thermally coupled with at least one of a fluid and a housing forming a containment volume;
   detecting one or more reflected portions of the ultrasonic signal reflected from one or more interfaces of the buffer;
   measuring a time of flight of the one or more reflected portions of the ultrasonic signal;
   determining a temperature of the buffer based at least partially on the time of flight; and
   determining a temperature of at least one of the liquid and the housing based on the temperature of the buffer.

6. The method of claim 5, wherein determining the temperature is further based on tabulated data.

7. The method of claim 5, wherein the interface of the buffer is in contact with the fluid.

8. The method of claim 5, further comprising:
   repeating the causing, detecting, measuring and determining at a plurality of locations via a plurality of buffers; and
   determining a temperature profile of the fluid or the housing based on one or more of the determined temperatures.

9. The method of claim 5, wherein the fluid is flowing in the housing.

10. The method of claim 5, further comprising:
    repeating the causing, detecting, measuring and determining at a plurality of intervals; and
    using the plurality of determined temperatures for one or more of:
    applying a correction to a flow rate measurement;
    applying a control to a process;
    detecting an event; and
    recording the determined temperatures.

11. The method of claim 5, further comprising:
    determining a flow rate of the fluid based at least partially on the determined temperature.

12. A computer readable medium comprising instructions to be executed by processing logic, configured to:
    cause a transducer to generate an ultrasonic signal;
    detect a reflected portion of the ultrasonic signal reflected from one or more interfaces of a buffer, the buffer thermally coupled to at least one of a liquid and a housing forming a containment volume at least partially in contact with the liquid;
    measure a time of flight of the reflected portion of the ultrasonic signal;

determine a temperature of the buffer based at least partially on the time of flight; and determine a temperature of at least one of the liquid and the housing based on the temperature of the buffer.

13. The medium of claim 12, wherein determining the temperature is further based on tabulated data.

14. The medium of claim 12, wherein the instructions are further configured to:
   determine a flow rate of a fluid based at least partially on the determined temperature.

15. The medium of claim 12, wherein the instructions are further configured to:
   repeat the causing, detecting, measuring and determining at a plurality of locations via a plurality of buffers; and
   determine a temperature profile based on one or more of the determined temperatures.

16. The medium of claim 12, wherein the instructions are further configured to:
   repeat the causing, detecting, measuring and determining at a plurality of intervals; and
   use the plurality of determined temperatures for one or more of:
      applying a correction to a flow rate measurement;
      applying a control to a process;
      detecting an event; and
      recording the determined temperatures.

17. The apparatus of claim 1, wherein the temperature of the buffer is in equilibrium with at least one of the temperature of the fluid and the temperature of the housing.

* * * * *